United States Patent [19]

Yamamoto et al.

[11] Patent Number: 4,797,230

[45] Date of Patent: Jan. 10, 1989

[54] METHOD OF DISSOLVING SOLID OR SEMI-SOLID MATERIAL INTO SOLVENT

[75] Inventors: Kiyoshi Yamamoto; Toshihiro Nakamura; Tadao Ito; Keiichiro Inui, all of Osaka, Japan

[73] Assignee: Shinto Paint Co. Ltd., Amagasaki, Japan

[21] Appl. No.: 867,836

[22] Filed: May 28, 1986

[30] Foreign Application Priority Data

Jun. 24, 1985 [JP] Japan .................................... 137132

[51] Int. Cl.[4] ........................... B01F 1/00; B01F 3/12; B01J 8/02; B08B 3/04

[52] U.S. Cl. .................................. 252/364; 23/293 R; 134/22.18; 134/24; 134/34; 134/42; 422/261; 422/263; 422/264; 423/658.5

[58] Field of Search ............... 422/902, 261, 263, 264, 422/266, 266 H; 423/658.5; 134/34, 40, 42, 22.18, 23, 24; 252/364; 23/293 R

[56] References Cited

U.S. PATENT DOCUMENTS 1,807,263 5/1931 Walter ............................ 422/902 X
2,584,910 2/1952 Ohlwiler ............................ 422/266
3,468,809 9/1969 Bloom .......................... 423/658.5 X
4,427,643 1/1984 Fowler ......................... 423/658.5 X

*Primary Examiner*—John F. Terapane
*Assistant Examiner*—Virginia B. Caress
*Attorney, Agent, or Firm*—Armstrong, Nikaido, Marmelstein & Kubovcik

[57] ABSTRACT

Applicants' invention relates to a method for dissolving a solute material in a container by contacting the solute with a solvent in another container. Applicants' method relies upon the difference in the specific gravities of the solvent and the solute to create a convection current between their respective containers. The material, either the solute or the solvent, having the larger specific gravity is placed above the material having the smaller specific gravity, and the two materials are brought into contact. The solute dissolves in the solvent, and the resulting solution, which has a lower or higher specific gravity than the solvent, causes a convection current which draws the heavier material down and the lighter material up. As the convection current proceeds, the undissolved solute continues to come into contact with fresh solvent accelerating the dissolution process.

4 Claims, 1 Drawing Sheet

METHOD OF DISSOLVING SOLID OR SEMI-SOLID MATERIAL INTO SOLVENT

Figure 1:
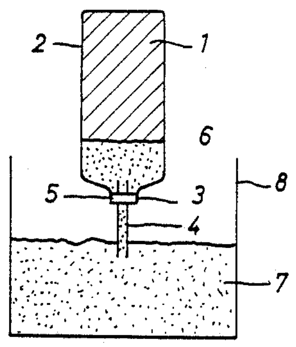

This invention relates to a method of dissolving a solid or semi-solid material (solute) which has formed a hard mass in a container, with a solvent in another container, without heating the solute.

In general, a flowable granular solid or semi-solid material, irrespective of its size, can be taken out through the opening of its container without breaking the container. But it is not easy to take out a solid or semi-solid material which has formed a hard mass in the container.

For this reason, in order to take out a solid or semi-solid material which has formed a hard mass in a can, bottle or other containers, without breaking the container, it is generally the practice to heat and melt the material. For example a container containing a material which has formed a hard mass is heated directly or indirectly to melt the material in the container to make it fluid, and then it is taken out of the container.

However, not only when it is heated directly but also when heated indirectly, if the material is thermally unstable, the heating method cannot be used. Also, in the case of indirect heating, if the temperature of the heating medium is lower than the melting point of the material, this method cannot be used. Furthermore, since a large thermal energy is required for both methods, the heating methods are disadvantageous in cost.

Therefore to take out a solid or semi-solid material which has formed a hard mass in a container, without necessitating heating means, there is a method wherein the material is taken out as a solution by dissolving it as a solute in a solvent capable of dissolving the material.

In the method of dissolving the solute with a solvent, when the container is filled with the solute almost completely, the solvent cannot be introduced into the container, so that it is impossible to take out the solute by dissolving it by the solvent.

Moreover, even when the solute container has a vacant space which can be filled with the solvent, the interface at which the solute comes in contact with the solvent is limited only to the surface contacting the container space, so that the efficiency of contact between the solute and the solvent is poor. Therefore, after a certain degree of dissolution has proceeded, further dissolution does not go substantially. Furthermore, when the quantity of the solvent that can be filled in is small in comparison with the quantity of the solute (which is the usual case), the proportion of the quantity of the soluble solute to the quantity of the solvent becomes small, so that the dissolution efficiency of the solvent is poor, this requiring a long time for dissolution.

For this reason, in order to elevate the dissolution efficiency of the solvent to the solute, a method may be thought out wherein the solvent is forced to circulate by means of a pump for example, to force the solvent into contact with the solute so as to dissolve the solute better. However, this method necessitates power energy to drive the pump. It also necessiates equipment for solvent circulation. Therefore, it is necessary to study how to cope with the static electricity accompanied with such an equipment and to solve the problem of its temperature control.

Accordingly, the object of this invention is to provide a method which does not necessitate the use of a pump as mentioned above or other circulation means and can yet dissolve the solute in the container even when the solute has formed a hard mass to the fill in the container. In other words, this invention provides a method of dissolution of a solute by means of a solvent, by utilizing a difference in specific gravity between the solute and the solvent, and utilizing the natural convection phenomenon of the solvent and the solute dissolved therein.

This invention is a method of dissolving a solid or semi-solid solute having formed a hard mass in a container equipped with a takeout opening or, by means of a solvent in another container, wherein the solvent and the solute are brought into contact, with either of said solute or said solvent having larger specific gravity being positioned above and the other having smaller specific gravity being positioned below.

The solute usable in this invention may be any substance which is solid or semi-solid at room temperature. Any solvent may be used which is liquid at room temperature and can dissolve the solute. It is necessary that there should be a difference in specific gravity between the solute and the solvent used in this invention. When there is no difference in specific gravity, it is impossible to effect the dissolution of the solute by the solvent, as will be mentioned later.

The larger the difference in specific gravity between the solute and the solvent, the easier is the progress of the dissolution, so that a larger difference is desirable. It is favorbale that the viscosity of the solvent should be as low as possible. A high viscosity is undesirable because when the viscosity is high the substitution efficiency of the solvent on the surface of contact with the solute becomes poor. When the viscosity of the solvent is high, the viscosity may be lowered by heating the solvent, if desired. If is desirable to heat the solvent, because heating generally increases the solubility of the solute in the solvent.

According to this invention, for example when the specific gravity of the solute is larger than that of the solvent, the solvent is introduced through the takeout opening into the vacant space in the container containing the solid solute to fill the solute container, and the solute container is inserted into the solvent of the solvent container so that the solute container will stand upside down, with the opening of the solute container directed below. Thus the solute and the solvent come in contact at the interface, with the solute having larger specific gravity placed above and the solvent having smaller specific gravity placed below. The solute brought in contact with the solvent is dissolved in the solvent, and since the solvent part containing the dissolved solute has a larger specific gravity than that of the solvent part below containing no dissolved solute or solute dissolved a little, it flows down through the takeout opening into the solvent container. Then it is replaced with the solvent part containing no dissolved solute or solute dissolved a little, and this part newly comes in contact with the solute. Thus, a convection current is generated continuously in the solvent part in the solvent container and in the solute container so as to effect the dissolution of the solute in the solvent solution and to form a homogeneous solution.

As is apparent from the above-mentioned description, since it is necessary to bring the solvent and the solute into contact, there must not exist any vacant space such as air between them. To attain this, when the solute is placed above, it is necessary to fill the solute container with the solvent previously, and then insert it into the solvent container so that the solute container will stand upside down, as mentioned above.

When the specific gravity of the solute is smaller than that of the solvent, the two are brought into contact in such a manner that the solute is placed below and the solvent is placed above. In this case, since the solute dissolved by contact with the solvent has a smaller specific gravity than that of the solvent, the part which has become a solution goes up and places itself with the solvent existing above which contains no or a little dissolved solute. Thus, a convection phenomenon is caused and the solute always comes in contact with a fresh solvent part containing no or a little dissolved solute, accelerating the dissolution of the solute.

In carrying out this invention, it is necessary to prepare a takeout opening or openings for introducing the solvent to dissolve the solute by bringing the solute into contact with the solvent and for taking out the dissolved solute. The capacity of the solvent container should be such that it can accomodate the total volume of the solvent and dissolved solute (the total volume of the solution).

In order to carry out the method of this invention efficiently, it is favorable to prepare separately an outlet opening for the solution of dissolve solute and an inlet opening for the solvent or the solvent solution of the solute at low concentration so as to avoid the contact of the two fluids.

This invention will be further explained with the following Examples and by referring partly to the accompanying drawings wherein each of FIG. 1–4 is a schematic view of an apparatus suitable for carrying out the method of this invention.

EXAMPLE 1

When the specific gravity of the solute is larger than that of the solvent:

As shown in FIG. 1, a stopper (5) to which a glass tube (4) was attached, was fixed to a takeout opening (3) of a glass bottle (2) (500 ml in capacity) containing 500 g of a disinfectant 2,4,6-trichlorophenol (solute) (1), crystallized forming a hard mass and having a specific gravity of 1.49 (75° C./4° C.). Vacant space (6) of the bottle (2) and the glass tube (4) were filled with methanol (solvent) having a specific gravity of 0.80 (15° C./4° C.). The bottle (2) was made to stand upside down in such a manner that the glass tube (4) was inserted into a solvent container (8), 2 liters in capacity, containing 500 ml methanol. Thus methanol and 2,4,6-trichlorophenol were brough into contact.

In this state, the apparatus was allowed to stand overnight. At first, 2,4,6-trichlorophenol dissolved in methanol in the vacant space (6) and formed a brown liquid near the contact surface. The brown liquid gradually flowed down through the glass tube (4), and it flowed into the colorless transparent methanol (7) in the solvent container (8). The whole progress could be clearly observed. After standing overnight, the contents within the containers (2) and (8) became a homogeneous liquid.

EXAMPLE 2

Figure 2:
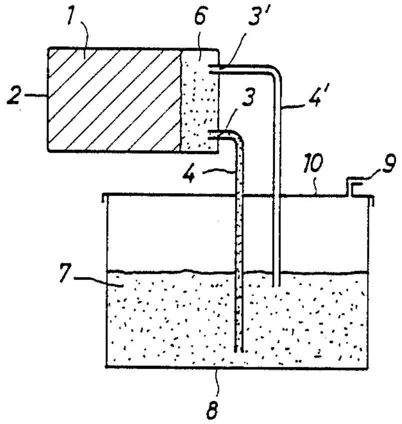

When the specific gravity of the solute is larger than that of the solvent:

As shown in FIG. 2, takeout openings (3) and (3') were set to a 200 liter capacity steel drum container (2) containing 310 kg insecticide chloropyriphosmethyl (solute) (1), crystallized to form a hard mass and having a specific gravity of 1.63 (20° C./4° C.).

As shown in the Figure, pipes (4) and (4') were attached to the takeout openings (3) and (3'). The open ends of the pipes (4) and (4') were inserted into a 1000 liter capacity container (8) containing 350 liter xylol (solvent) having a specific gravity of 0.87. The end of the pipe (4) was set near the bottom and the end of the pipe (4') was set near the liquid surface. The vacant space (6) of the drum container (2) and the interior of the pipes (4) and (4') were filled with xylol previously to remove air. Then a cover (10) equipped with a opening (9) was placed on the container (8).

In this state, the apparatus was allowed to stand for about 48 hours. At first, the solute chloropyriphosmethyl (1) dissolved by contact with the solvent xylol (7) in the drum container (2) flowed down gradually the xylol filled space (6) through the pipe (4), and diffused to the solvent container (8). The solvent (7) in the container (8) rose through the pipe (4') into the xylol filled space (6) of the drum container (2). By this convention movement, after 48 hours the solute chloropyriphosmethyl dissolved in xylol completely, and 610 kg of about 50% chloropyriphosmethyl xylol solution (specific gravity 1.10 at 20° C./4° C.) was obtained. During dissolution, no temperature rise was observed.

EXAMPLE 3

Figure 3:
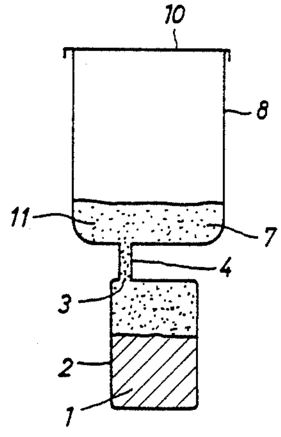

When the specific gravity of the solute is smaller than that of the solvent (7):

As shown in FIG. 3, a pipe (4), one inch in inner diameter, was attached to a takeout opening (3) of a 18 liter capacity petrol can (2) containing 15 kg of a wax-like solid waterproof agent paraffin (solute) (1) having a specific gravity of 0.90 (20° C./4° C.). The other end of this pipe (4) was connected to an opening (11) at the bottom of a 50 liter steel container (8). Then, 20 liters of carbon disulfide (solvent) (7) having a specific gravity of 1.26 (20° C./4° C.) were put into the container (8) and a cover (10) was placed on the container (8). In this state, the apparatus was allowed to stand for one day at room temperature. The paraffin dissolved completely in carbon disulfide, and formed a homogeneous solution.

EXAMPLE 4

Figure 4:
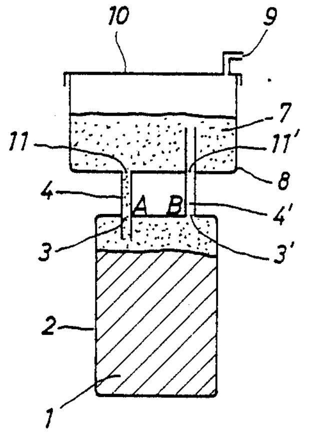

When the specific gravity of the solute is smaller than that of the solvent:

As shown in FIG. 4, takeout openings (3) and (3') were set to a drum container (2) containing wax-like solid plasticizer coconut butter (solute) (1) having a specific gravity of 0.91 (40° C./4° C.). To the takeout openings (3) and (3'), were attached pipes (4) and (4'), 2 inches in inner diameter. One end of the pipe (4) was extended to near the interface of the coconut butter (1) in the drum container (2), and the other end was attached to an opening (11) at the bottom of a solvent container (8). One end of the pipe (4') was attached to a takeout opening (3') of the drum container (2), and the other end was extended to the interior of the solvent container (8). Then 300 liter chloroform (solvent) (7) having a specific gravity of 1.48 (20° C./4° C.) was poured into the solvent container (8). A cover (10) having an opening (9) was placed on the solvent container (8).

In this state, the apparatus was allowed to stand for three days. The coconut butter (1) dissolved completely in chloroform (7) to form a homogeneous liquid.

As is apparent from the above-mentioned Examples, the method of this invention makes it possible to dissolve a solid or semi-solid material (solute) which has formed a hard mass in a container, relatively quickly in a solvent, utilizing the convection phenomenon caused by the difference between the solvent and the solute, without heating said material or circulating the solvent by force as has been done heretofore, and this this method is especially suitable for dissolving a solid or semi-solid material which is thermally unstable.

What we claim is:

1. A method of dissolving a solid or semi-solid material which has formed a hard mass in a container equipped with a takeout opening or takeout openings in communication with a solvent in another container, comprising contacting the solvent and the solute by positioning the container of one of said solute or said solvent which has the larger specific gravity above the container of the other which has the smaller specific gravity, whereby dissolution of the solute in the solvent forms a solution having a different specific gravity than the solvent which creates convection currents drawing the heavier material down and the lighter material up.

2. The method of dissolution as claimed in claim 1, wherein when there is a vacant space in the solute container and the specific gravity of the solute is larger than that of the solvent, the vacant space in the solute container is filled with the solvent prior to positioning the solute container above the solvent containers.

3. The method of dissolution as claimed in claim 1, wherein the solvent container has a total volume sufficient to accommodate the total volume of the resulting solution.

4. The method of dissolution as claimed in claim 1, wherein the solvent container and the solute container are functionally connected by a first pipe through which the solution of dissolved solute moves from the solute container into the solvent container and by a second pipe through which solvent or a solvent solution of the solute at low concentration moves from the solvent container into the solute container.

* * * * *